US012776709B1

(12) United States Patent
Pellegrini et al.

(10) Patent No.: US 12,776,709 B1
(45) Date of Patent: Oct. 27, 2026

(54) INVERTING BUCK-BOOST CONVERTER WITH RIPPLE-BASED ADAPTIVE CONSTANT ON-TIME CONTROL FOR AMOLED DISPLAY POWER SUPPLY

(71) Applicant: STMicroelectronics International N.V., Geneva (CH)

(72) Inventors: Riccardo Pellegrini, Rho (IT); Alberto Cattani, Cislago (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/322,900

(22) Filed: Sep. 9, 2025

(51) Int. Cl.
*H02M 3/158* (2006.01)
*G09G 3/3266* (2016.01)
*H02M 1/00* (2007.01)
*H02M 1/088* (2006.01)
*H02M 3/157* (2006.01)

(52) U.S. Cl.
CPC ........ *H02M 3/1582* (2013.01); *G09G 3/3266* (2013.01); *H02M 1/0045* (2021.05); *H02M 3/157* (2013.01); *G09G 2310/0254* (2013.01); *G09G 2310/0291* (2013.01); *G09G 2310/066* (2013.01); *G09G 2330/023* (2013.01); *H02M 1/088* (2013.01)

(58) Field of Classification Search
CPC .. H02M 3/1582; H02M 1/0045; H02M 3/157; H02M 1/088; G09G 3/3266; G09G 2310/0254; G09G 2310/0291; G09G 2310/066; G09G 2330/023
See application file for complete search history.

(56) References Cited

U.S. PATENT DOCUMENTS

| | | | | | |
|---|---|---|---|---|---|
| 10,222,814 | B1 | 3/2019 | Chakraborty et al. | | |
| 10,447,161 | B2 | 10/2019 | Bayer et al. | | |
| 11,658,572 | B2 | 5/2023 | Gandhi et al. | | |
| 2008/0088292 | A1* | 4/2008 | Stoichita | H02M 3/156 | 323/285 |
| 2011/0018516 | A1* | 1/2011 | Notman | H02M 3/1588 | 323/284 |
| 2016/0087535 | A1* | 3/2016 | Hsiao | H02M 3/338 | 307/31 |
| 2021/0100082 | A1* | 4/2021 | Aoki | H05B 45/48 | |
| 2021/0124382 | A1 | 4/2021 | Deka et al. | | |
| 2023/0353053 | A1 | 11/2023 | Ramorini et al. | | |

* cited by examiner

*Primary Examiner* — Muhammad N Edun
(74) *Attorney, Agent, or Firm* — Crowe & Dunlevy LLC

(57) ABSTRACT

A power management integrated circuit (PMIC) for AMOLED displays includes a negative voltage generator using an adaptive constant-on-time (COT) ripple-based inverting buck-boost architecture. The circuit features a ripple reconstructor that addresses load regulation issues by regenerating attenuated ripple signals from the switching node. The ripple reconstructor utilizes an error amplifier functions as an integrator at low frequencies for accurate DC regulation, and operates as an AC buffer at higher frequencies to preserve ripple information. An adaptive TON control circuit dynamically adjusts the high-side power transistor on-time based on input and output voltage differentials, maintaining pseudo-fixed switching frequency regardless of operating conditions.

23 Claims, 10 Drawing Sheets

FROM FIG. 10A

INVERTING BUCK-BOOST CONVERTER WITH RIPPLE-BASED ADAPTIVE CONSTANT ON-TIME CONTROL FOR AMOLED DISPLAY POWER SUPPLY

TECHNICAL FIELD

This disclosure relates to power management integrated circuits (PMICs) for active-matrix organic light-emitting diode (AMOLED) displays and, more particularly, to an adaptive constant-on-time ripple-based inverting buck-boost architecture for generating a regulated negative power supply voltage.

BACKGROUND

Active-matrix organic light-emitting diode (AMOLED) displays require efficient and precise power management to provide for suitable image quality, long display life, and reduced power consumption. Power management integrated circuits (PMICs) designed for AMOLED displays are configured to provide multiple regulated voltages and currents, including negative voltages, while also managing power-up and power-down so as to protect display pixels. Conventional DC-DC converter designs used in PMICs rely on voltage mode control or peak current mode control architectures that have certain drawbacks.

Both voltage mode control and peak current mode control suffer from increased complexity in their implementations, requiring feedback mechanisms and compensation networks. This complexity becomes particularly of concern when attempting to optimize for the varying power demands of AMOLED displays. For example, both control methodologies require feedforward loops to achieve satisfactory line transient response, and the control schemes used to implement both forms of mode control contribute to higher quiescent current consumption. This higher quiescent current directly impacts standby power usage and battery life in portable devices, persisting even when the AMOLED display is in a low-power mode. Additionally, neither form of mode control naturally exhibits pulse frequency modulation behavior at low loads, necessitating additional pulse skip circuitry, further compromising power efficiency while adding to complexity.

This combination of drawbacks compromises both power efficiency and design simplicity. As such, further development is needed.

SUMMARY

A voltage source circuit generates a negative supply voltage. The circuit includes a power stage that operates based upon gate drive signals, with the power stage including a switching node. An error amplifier operates as an integrator at frequencies below a predetermined threshold and as an AC buffer at frequencies above the predetermined threshold, and generates a control voltage based upon a feedback signal. A ripple reconstructor circuit reconstructs an attenuated ripple signal from the switching node. A comparator has a non-inverting input coupled to receive the control voltage and an inverting input coupled to an output of the ripple reconstructor circuit, with the comparator generating a request signal. An adaptive on-time control circuit generates an end-of-on-time signal based on an input voltage and the negative supply voltage. Asynchronous logic receives the request signal and the end-of-on-time signal and generates the gate drive signals based thereupon.

The voltage source circuit may further include a digital-to-analog converter (DAC) that generates a reference voltage and a voltage divider network coupled between an output of the voltage source circuit and the power stage, with the voltage divider network providing the feedback signal.

The power stage may include a first transistor having a drain coupled to the input voltage, a source coupled to the switching node, and a gate that receives a first gate drive signal, a second transistor having a drain coupled to the switching node, a source coupled to an output node, and a gate that receives a second gate drive signal, an inductor coupled between the switching node and ground, and an output capacitor coupled between the output node and ground. The voltage source circuit may be configured as an inverting buck-boost converter that generates the negative supply voltage at the output node, with the feedback signal generated based upon the negative supply voltage.

The power stage may be configured to operate in continuous conduction mode when current through the inductor remains above zero throughout a switching cycle under heavy load conditions, and in discontinuous conduction mode when current through the inductor reaches zero during a switching cycle under light load conditions.

The adaptive on-time control circuit may include an operational transconductance amplifier (OTA) configured as a voltage controlled current generator that generates an output current proportional to a difference between the input voltage and the negative supply voltage, a timing capacitor that is charged by the output current, and a comparator that generates the end-of-on-time signal when a voltage across the timing capacitor exceeds a reference threshold.

The adaptive on-time control circuit may further include a switch that discharges the timing capacitor in response to a reset signal.

The error amplifier may include a resistor and capacitor network that provides the integrator operation at frequencies below the predetermined threshold and the AC buffer operation at frequencies above the predetermined threshold, wherein an impedance of the network determines a transition between the integrator operation and the AC buffer operation.

The ripple reconstructor circuit may include a resistor-capacitor network that couples to the switching node and filter it in low-pass manner, and circuitry that combines that filtered version of the switching node signal with a reference voltage to generate the reconstructed ripple signal.

A method of generating a negative supply voltage generates a control voltage using an error amplifier that operates as an integrator at frequencies below a predetermined threshold and as an AC buffer at frequencies above the predetermined threshold based upon a feedback signal. The method reconstructs an attenuated ripple signal from a switching node using a ripple reconstructor circuit. The method compares the control voltage with the reconstructed ripple signal to generate a request signal. The method generates an end-of-on-time signal based on an input voltage and the negative supply voltage using an adaptive on-time control circuit. The method generates gate drive signals based upon the request signal and the end-of-on-time signal using asynchronous logic. The method operates a power stage based upon the gate drive signals to generate the negative supply voltage.

The method may further generate a reference voltage using a digital-to-analog converter (DAC) and provide the feedback signal using a voltage divider network coupled to an output of the voltage source circuit.

Operating the power stage may include switching a first transistor and a second transistor at a switching frequency in an inverting buck-boost configuration, transferring energy through an inductor coupled between the switching node and ground, and storing energy in an output capacitor to maintain the negative supply voltage.

The method may further include operating the power stage in continuous conduction mode when current through the inductor remains above zero throughout a switching cycle under heavy load conditions, and in discontinuous conduction mode when current through the inductor reaches zero during a switching cycle under light load conditions.

Generating the end-of-on-time signal may include generating an output current proportional to a difference between the input voltage and the negative supply voltage using an operational transconductance amplifier, charging a timing capacitor with the output current, and comparing a voltage across the timing capacitor with a reference threshold to generate the end-of-on-time signal.

The adaptive on-time control circuit may maintain a substantially constant switching period that is independent of variations in the input voltage and the negative supply voltage.

An active matrix organic light emitting diode (AMOLED) display system includes an AMOLED display panel having pixels that emit light based on applied voltages and a power management integrated circuit (PMIC) coupled to the AMOLED display panel. The PMIC includes a voltage source circuit that generates a negative supply voltage. The voltage source circuit includes a power stage that operates based upon gate drive signals, with the power stage including a switching node. An error amplifier operates as an integrator at frequencies below a predetermined threshold and as an AC buffer at frequencies above the predetermined threshold, and generates a control voltage based upon a feedback signal. A ripple reconstructor circuit reconstructs an attenuated ripple signal from the switching node. A comparator has a non-inverting input coupled to receive the control voltage and an inverting input coupled to an output of the ripple reconstructor circuit, with the comparator generating a request signal. An adaptive on-time control circuit generates an end-of-on-time signal based on an input voltage and the negative supply voltage. Asynchronous logic receives the request signal and the end-of-on-time signal and generates the gate drive signals based thereupon. A first voltage source circuit generates a positive supply voltage for the pixels of the AMOLED display panel. The AMOLED display panel receives the negative supply voltage and the positive supply voltage to provide a voltage differential for driving the pixels.

The PMIC may further include a first low drop-out amplifier that regulates the positive supply voltage and a second low drop-out amplifier that regulates the negative supply voltage.

The AMOLED display system may further include a digital-to-analog converter (DAC) that generates a reference voltage and a voltage divider network coupled between an output of the voltage source circuit and the power stage, with the voltage divider network providing the feedback signal.

The power stage may include a first transistor having a drain coupled to the input voltage, a source coupled to the switching node, and a gate that receives a first gate drive signal, a second transistor having a drain coupled to the switching node, a source coupled to an output node, and a gate that receives a second gate drive signal, an inductor coupled between the switching node and ground, and an output capacitor coupled between the output node and ground. The voltage source circuit may be configured as an inverting buck-boost converter that generates the negative supply voltage at the output node, with the feedback signal generated based upon the negative supply voltage.

The power stage may be configured to operate in continuous conduction mode when current through the inductor remains above zero throughout a switching cycle under heavy load conditions, and in discontinuous conduction mode when current through the inductor reaches zero during a switching cycle under light load conditions.

The adaptive on-time control circuit may include an operational transconductance amplifier (OTA) configured as a voltage controlled current generator that generates an output current proportional to a difference between the input voltage and the negative supply voltage, a timing capacitor that is charged by the output current, and a comparator that generates the end-of-on-time signal when a voltage across the timing capacitor exceeds a reference threshold.

The adaptive on-time control circuit may further include a switch that discharges the timing capacitor in response to a reset signal.

The error amplifier may include a resistor and capacitor network that provides the integrator operation at frequencies below the predetermined threshold and the AC buffer operation at frequencies above the predetermined threshold, wherein an impedance of the network determines a transition between the integrator operation and the AC buffer operation.

The ripple reconstructor circuit may include a resistor-capacitor network that couples to the switching node, and filter it in low-pass manner, and circuitry that combines that filtered version of the switching node signal with a reference voltage to generate the reconstructed ripple signal.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Figure 1:
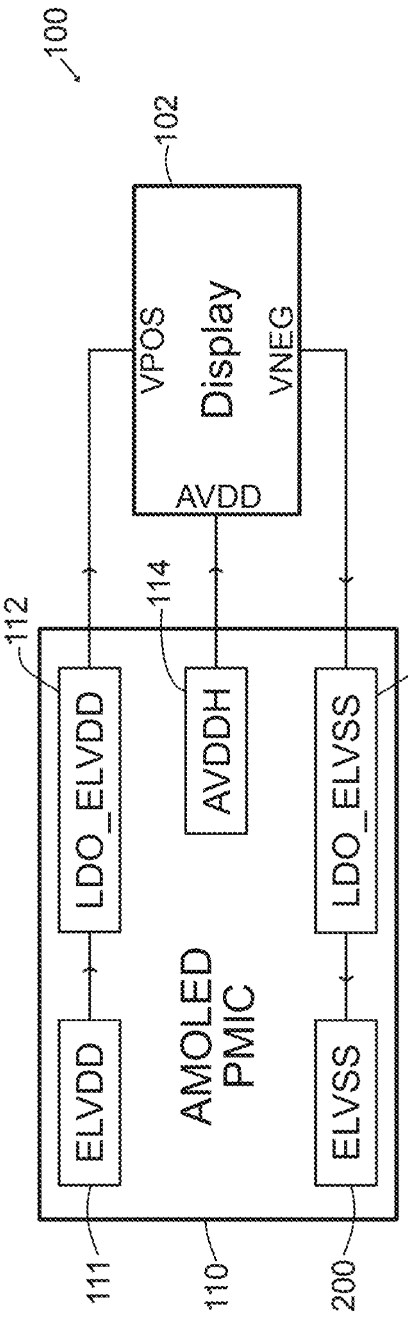
FIG. 1 is a block diagram of an AMOLED system disclosed herein including a display panel powered by a power management integrated circuit.

Now described with initial reference to FIG. 1 is an AMOLED system 100 including an AMOLED display panel 102 powered by a power management integrated circuit (PMIC) 110. In particular, the PMIC 110 includes a first voltage source circuit 111 that generates the voltage ELVDD (the positive power supply voltage for the pixels of the AMOLED display panel 102), which is then regulated by a low drop-out amplifier 112 to produce LDO_ELVDD (the regulated, positive supply voltage for the AMOLED display panel 102), and a second voltage source circuit 200 that generates the voltage ELVSS (the negative power supply for the pixels of the AMOLED display panel 102), which is then regulated by a low drop-out amplifier 113 to produce LDO_ELVSS (the regulated, negative supply voltage for the AMOLED display panel 102).

The display 102 receives these power supply voltages at terminals VPOS and VNEG respectively, which together provide the necessary voltage differential to drive the pixels of the AMOLED display panel 102. The PMIC 110 also provides AVDDH, which powers the analog circuitry of the AMOLED display panel 102, including the TFT (Thin-Film Transistor) gate drivers via the AVDD terminal.

Figure 2:
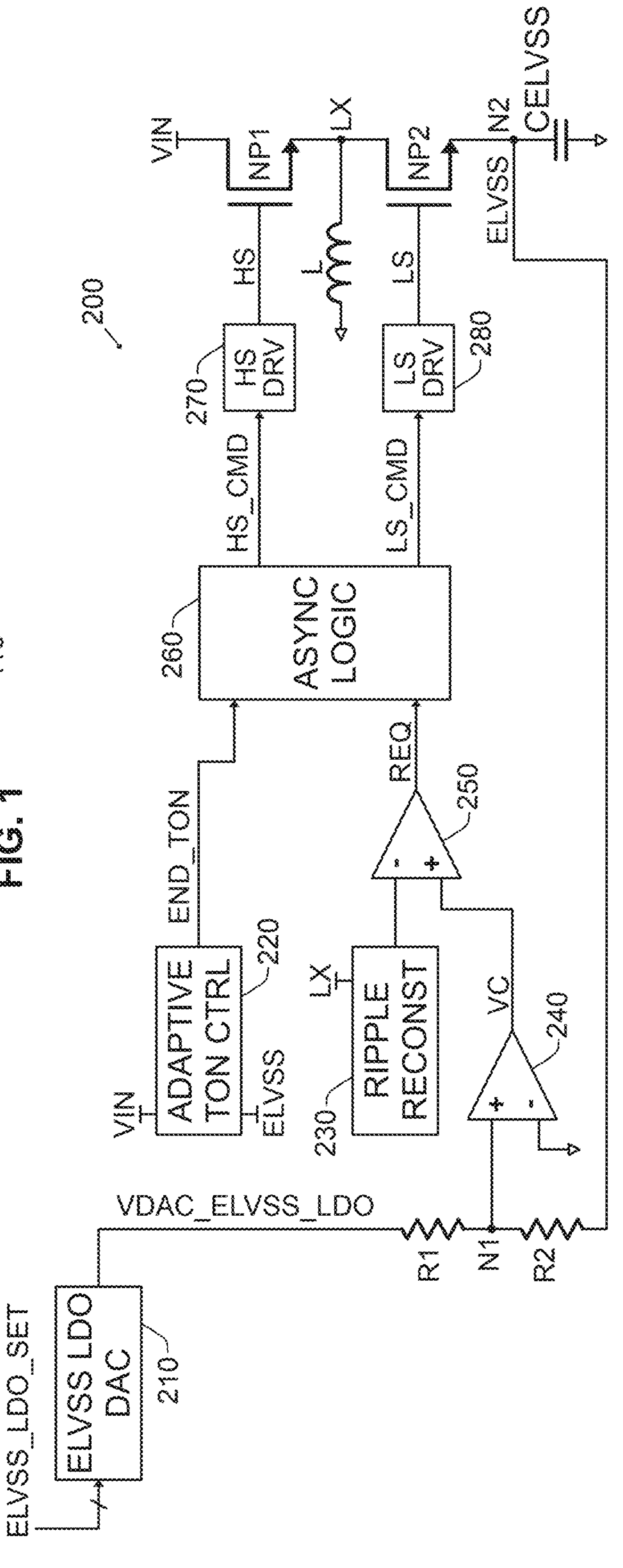
FIG. 2 is a block diagram of the second voltage source circuit of FIG. 1.

The second voltage source circuit 200 is now described with reference to FIG. 2. The second voltage source circuit 200 includes a digital to analog converter (DAC) 210 that converts the digital signal ELVSS_LDO_SET to an analog voltage VDAC_ELVSS_LDO, which is dropped across the series combination of resistors R1 and R2 connected between the output of DAC 210 and node N2. An amplifier 240 has its inverting input terminal coupled to ground and its non-inverting input terminal connected to node N1, which is a tap between resistors R1 and R2. A control voltage VC is produced at the output of amplifier 240.

An amplifier 250 functioning as a comparator has its non-inverting input connected to the output of amplifier 240 to receive the control voltage VC, has its inverting input connected to the output of ripple reconstructor 230, and generates the signal REQ at its output. Ripple reconstructor 230 receives input from switching node LX. An asynchronous logic 260 receives as input the signal REQ as well as the end of on-time signal END_TON, which is generated by an adaptive TON control circuit 220 that is using input voltage VIN and ELVSS to generate ON time.

The asynchronous logic 260, based upon the signals REQ and END_TON, generates the gate pre-drive signals HS_CMD and LS_CMD which are respectively provided to gate drivers 270 and 280 to generate gate drive signals HS and LS. The power stage includes n-channel transistor NP1 having its drain coupled to VIN, its source connected to switching node LX, and its gate connected to receive gate drive signal HS, and n-channel transistor NP2 having its drain connected to node LX, its source connected to node N2, and its gate connected to receive gate drive signal LS. An inductor L is connected between node LX and ground. A capacitor CELVSS is connected between node N2 and ground, and voltage ELVSS is at node N2, forming an inverting buck-boost converter topology.

The second voltage source circuit 200 implements an adaptive constant-on-time (COT) ripple-based inverting buck-boost architecture.

Operation begins with the DAC 210 establishing a reference voltage that sets the target output voltage for ELVSS. The amplifier 240 functions as an error amplifier, comparing the feedback from the R1, R2 voltage divider to ground, thereby generating control voltage VC. The error amplifier has a frequency-dependent behavior, acting as an integrator at low frequencies (below approximately 10 kHz) to ensure accurate DC regulation, while functioning as an AC buffer at higher frequencies to preserve ripple information—this will be described in greater detail hereinbelow.

The ripple reconstructor 230 addresses load regulation issues. Traditional ripple-based control schemes can suffer from inaccurate regulation due to ripple attenuation in the feedback network. The ripple reconstructor 230 effectively regenerates the attenuated ripple signal from the switching node LX, providing for proper operation of the control loop across varying load conditions.

The comparator 250 compares the control voltage VC from the error amplifier 240 with the reconstructed ripple signal, generating the REQ signal when the ripple exceeds the control voltage threshold. This REQ signal is sent to the asynchronous logic 260, which cooperates with the adaptive TON control circuit 220 to manage the operation of the power transistors NP1 and NP2.

The adaptive TON control circuit 220 dynamically adjusts the on-time of the high-side transistor NP1 based on the input voltage VIN and output voltage ELVSS to maintain a pseudo-fixed switching frequency in continuous conduction mode (CCM). This is achieved according to the relationship TSW=RC, where the switching period is independent of both input and output voltages, resulting in stable operation across varying conditions.

During operation, when REQ is asserted, the high-side transistor NP1 turns on for a duration determined by the adaptive TON controller 220. Once this on-time expires (indicated by the signal END_TON), the low-side transistor NP2 turns on until the next REQ signal. Energy is transferred to the output through the inductor L and stored in capacitor CELVSS, generating the negative voltage ELVSS.

Figure 5:
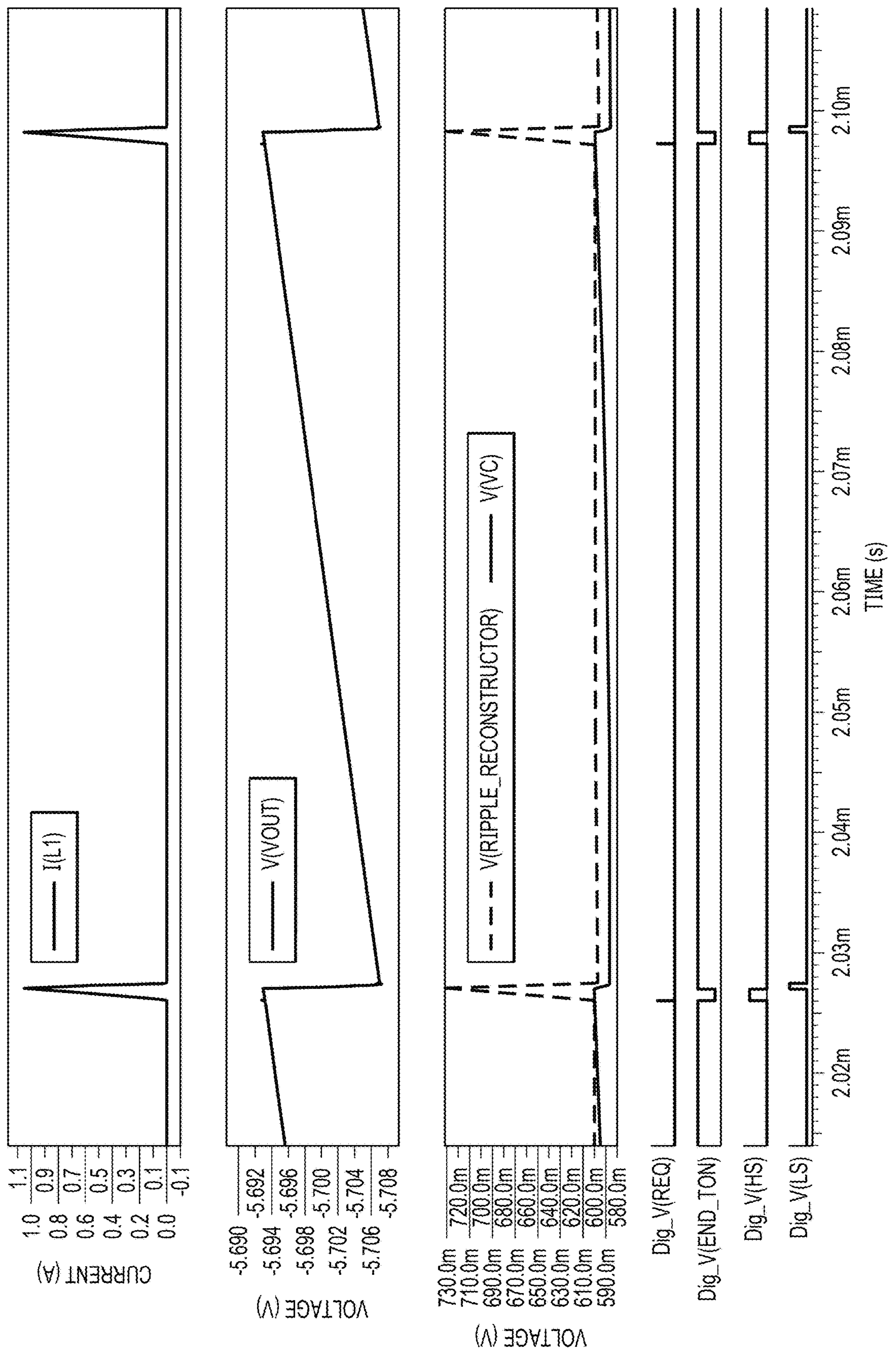
FIG. 5 is a set of waveforms illustrating operation of the second voltage source circuit under light load conditions.
Figure 6:
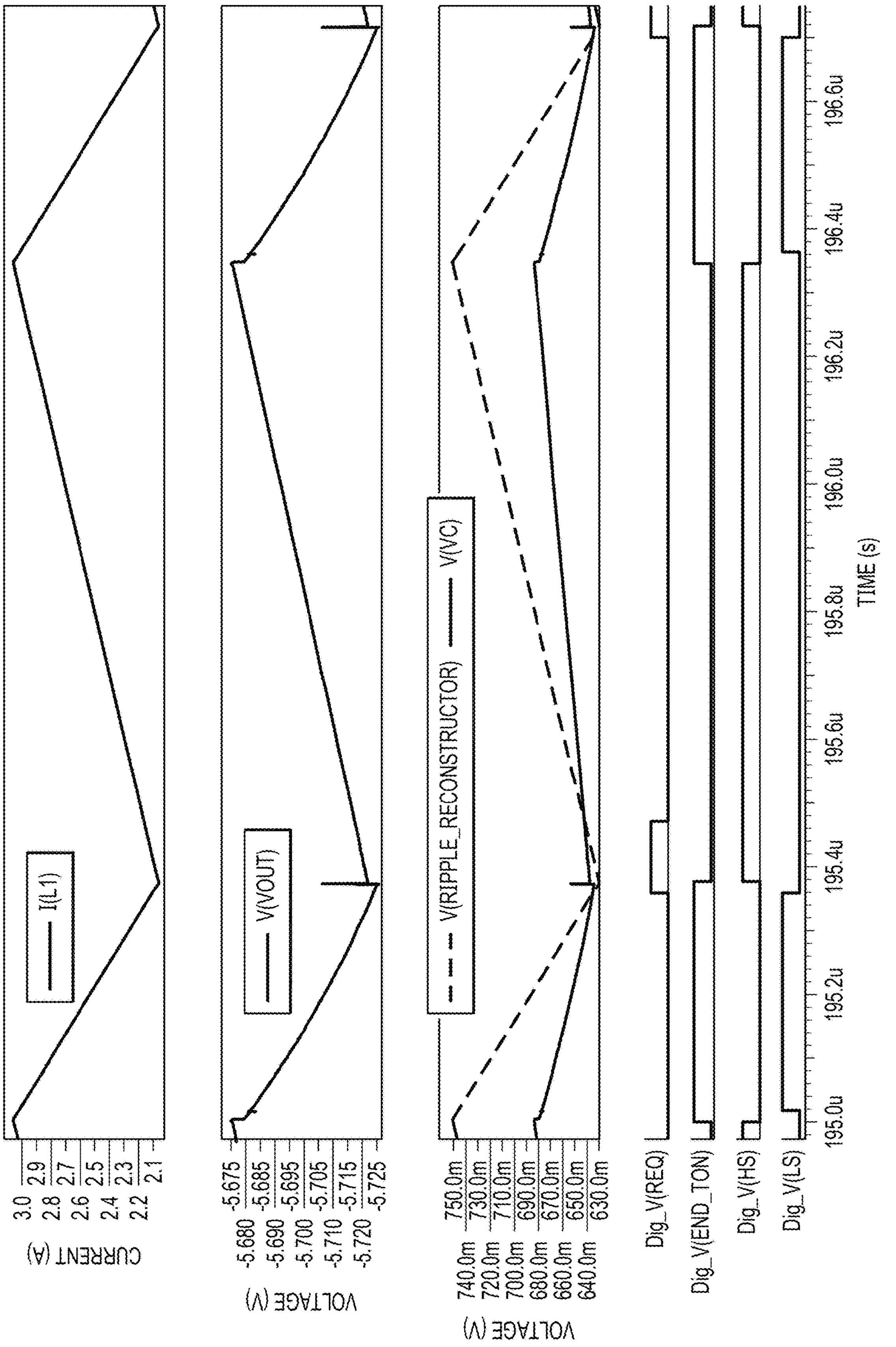
FIG. 6 is a set of waveforms illustrating operation of the second voltage source circuit under heavy load conditions.

The performance of the second voltage source circuit 200 is illustrated in FIGS. 5 and 6, which show simulation results under different load conditions. FIG. 5 shows the operation under light load conditions. In this mode, the circuit operates with infrequent switching pulses, as shown by the widely spaced current spikes in the top waveform (showing the current in inductor L). The middle waveform shows the ELVSS output voltage, which maintains regulation while exhibiting the characteristic saw-tooth ripple pattern as the capacitor CELVSS charges and discharges. The bottom waveforms show the ripple reconstruction signal output by the ripple reconstructor 230, closely tracking the control voltage VC, along with the digital control signals for switching.

FIG. 6 shows operation under heavy load conditions. Here, the circuit transitions to CCM with more frequent switching and significantly higher inductor current, as shown in the top waveform (showing the current in inductor L). The middle waveform displays the ELVSS output voltage with reduced ripple amplitude but higher frequency compared to the light load condition. The bottom portion shows how the ripple reconstructor signal properly tracks the higher frequency ripple, ensuring stable operation even at high loads. The digital control signals show increased switching frequency while maintaining the pseudo-fixed frequency characteristic of the adaptive COT control scheme.

These simulation results demonstrate the ability to maintain accurate ELVSS regulation across a wide range of load conditions while efficiently adapting switching behavior, showing the effectiveness of the ripple reconstructor 230 and adaptive TON control in maintaining stable operation.

Figure 3:
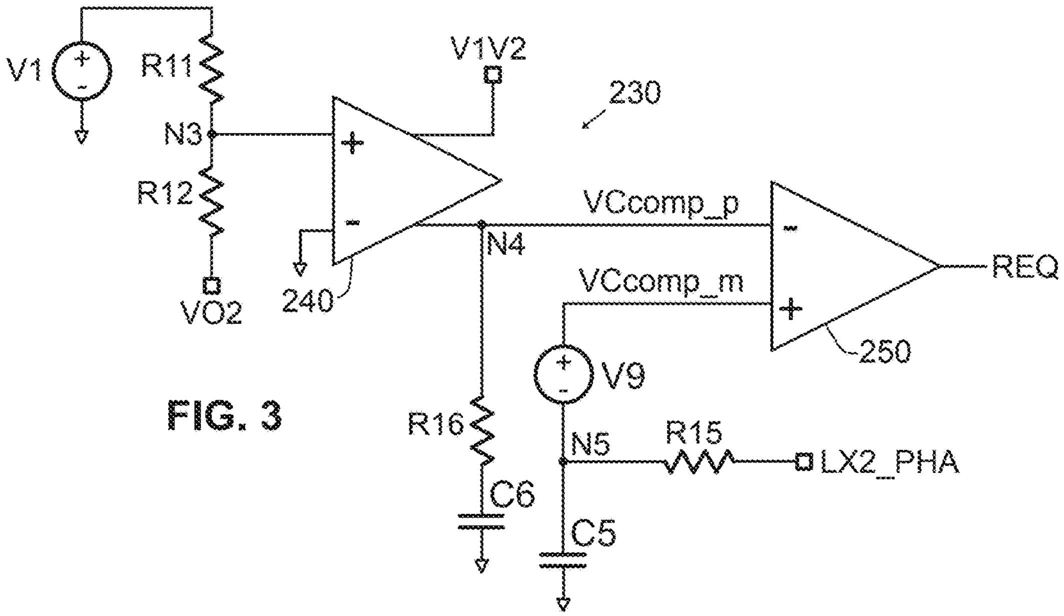
FIG. 3 is a schematic diagram of the ripple reconstructor circuit used in the second voltage source circuit of FIG. 2.

An example implementation of the feedback divider 215, ripple reconstructor 230, amplifier 240, and comparator 250 are now described in further detail with reference to FIG. 3. The feedback divider 215 includes resistors R11 and R12 connected in series between voltages V1 and VO2. Amplifier 240 is of single-ended type and has its inverting input coupled to ground and its non-inverting input connected to node N3, which is a tap between resistors R11 and R12. The output of amplifier 240 is connected to node N4. Resistor R16 and capacitor C6 are connected in series between node N4 and ground. Voltage VComp_p is generated at node N4. As to the ripple reconstructor 230 itself, a capacitor C5 is connected between node N5 and ground, a resistor R15 is connected between node N5 and LX, and a voltage V9 is connected to node N5. This ripple reconstructor 230 generates the voltage VCcomp_m. Amplifier 250 has its non-inverting input connected to receive VCcomp_p and its inverting input connected to receive VCcomp_m. REQ is produced at the output of amplifier 250, used as comparator.

Figure 7:
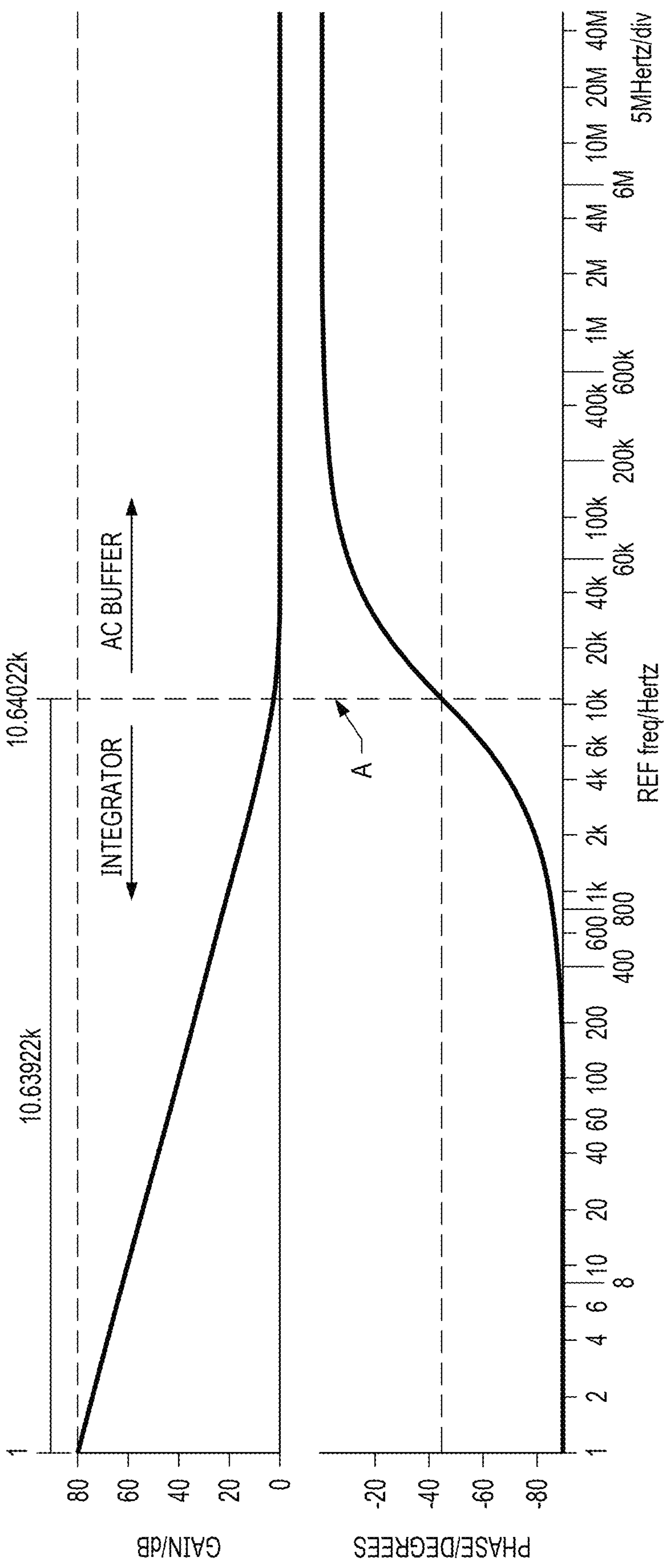
FIG. 7 is a Bode plot showing frequency response characteristics of the error amplifier in the ripple reconstructor circuit.

The ripple reconstructor 230 addresses an issue in ripple-based converters—the natural attenuation of ripple signals in the feedback network that can lead to poor load regulation. Amplifier 240 operates with dual characteristics based on frequency. As shown in the Bode plots in FIG. 7, at low frequencies (below approximately 10 kHz), amplifier 240 functions as an integrator with high gain, ensuring accurate DC regulation. The integrator behavior results from the frequency-dependent impedance created by R16 and C6 at its output.

At higher frequencies (above approximately 10 kHz), amplifier 240 transitions to function as an AC buffer with unity gain, preserving the ripple signal components necessary for proper converter timing. This transition is clearly marked in the Bode plots, where the gain curve crosses 3 dB and the phase shift crosses-45 degrees. This dual-mode operation enables the circuit to maintain both precise DC regulation and sufficient ripple information for stable switching control.

The LX signal, which contains information about the switching node, is coupled through R15 and combined with the reference voltage V9 to create VCcomp_m. This signal is then compared with VCcomp_p by comparator 250 to generate the REQ signal that drives the switching logic. The capacitor C5 provides filtering effect and generate the ripple information needed by the ripple reconstructor block.

Figure 8:
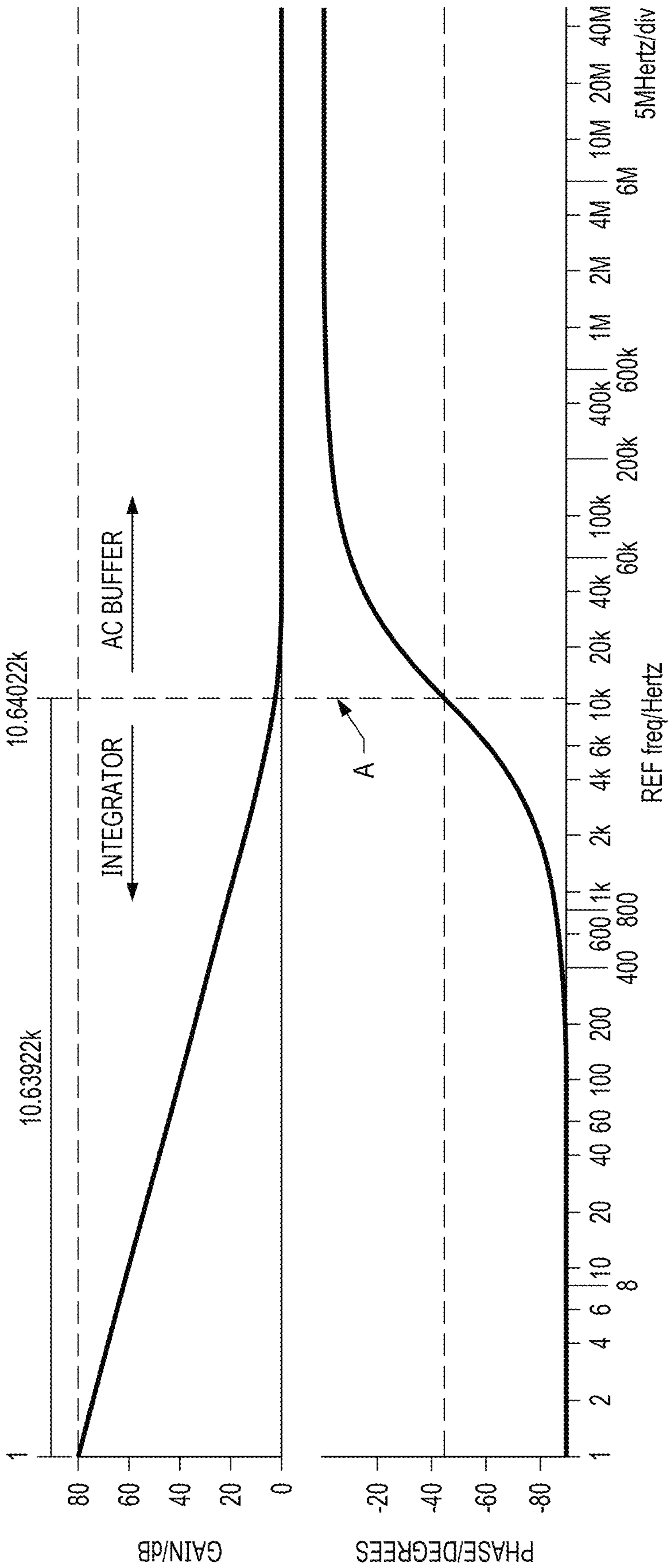
FIG. 8 is a set of waveforms showing load regulation performance of the second voltage source circuit.

This implementation solves the load regulation problem by preventing ripple attenuation in the control loop, ensuring the output voltage remains accurately regulated at the set value across varying load conditions. As shown in FIG. 8, the regulation remains stable with the output voltage maintaining a consistent level around-3.5V while the inductor current and control signals (shown in the bottom waveforms) operate with regular timing. The frequency-selective behavior of the amplifier, transitioning from integrator to AC buffer, maintains both regulation accuracy and switching stability.

Figure 4:
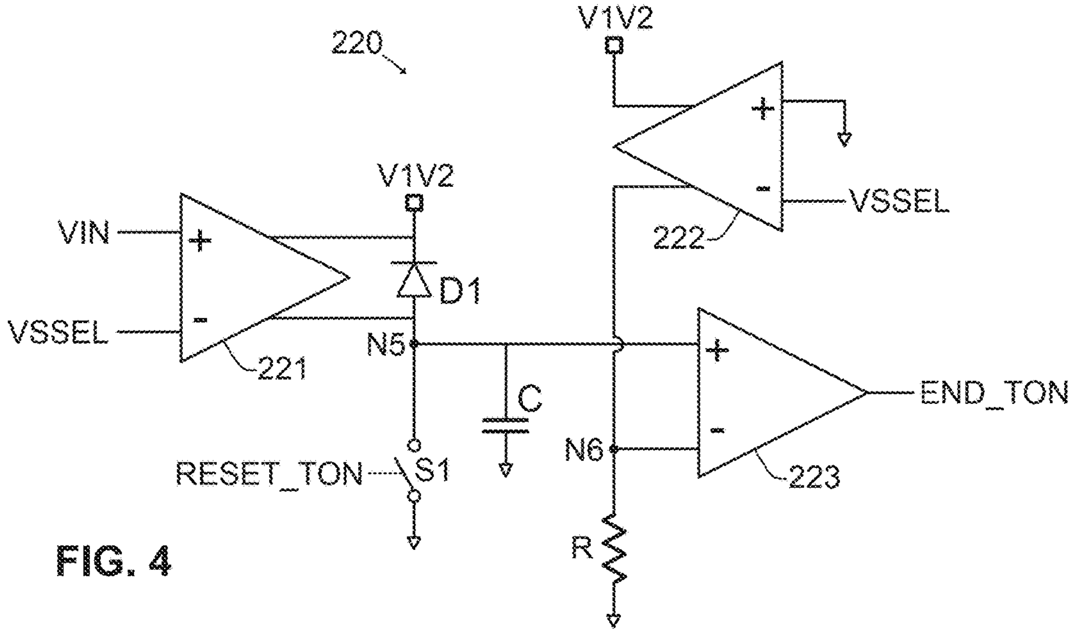
FIG. 4 is a schematic diagram of the adaptive TON control circuit used in the second voltage source circuit of FIG. 2.

The adaptive TON control circuitry 200 is now described with reference to FIG. 4. The adaptive TON control circuitry 200 includes an operational transconductance amplifier (OTA) 221 configured as a voltage controlled current generator that generates an output current proportional to (VIN-VSSEL), having its non-inverting input coupled to VIN, its inverting input coupled to VSSEL, and its current output connected to node N5. Switch S1, operated based upon the RESET_TON signal, is connected between node N5 and ground. Capacitor C is connected between node N5 and ground. Resistor R is connected between node N6 and ground. Amplifier 223 has its non-inverting input connected to node N5, its inverting input connected to node N6, and generates the END_TON signal at its output. Voltage controlled current generator 222 has its non-inverting input coupled to ground, its inverting input coupled to VSSEL, and its current output connected to node N6

Figure 9:
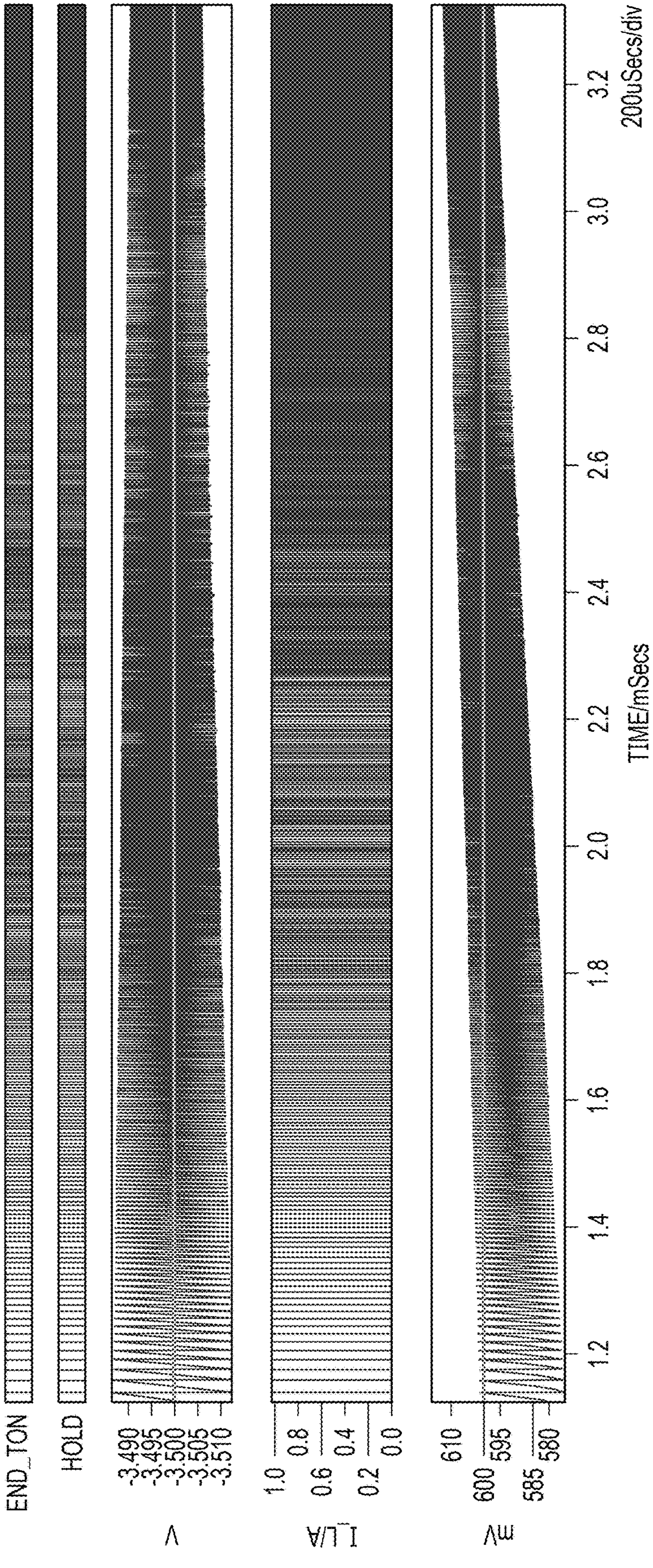
FIG. 9 is a set of waveforms showing the response of the second voltage source circuit to slow load transients.
Figure 10:
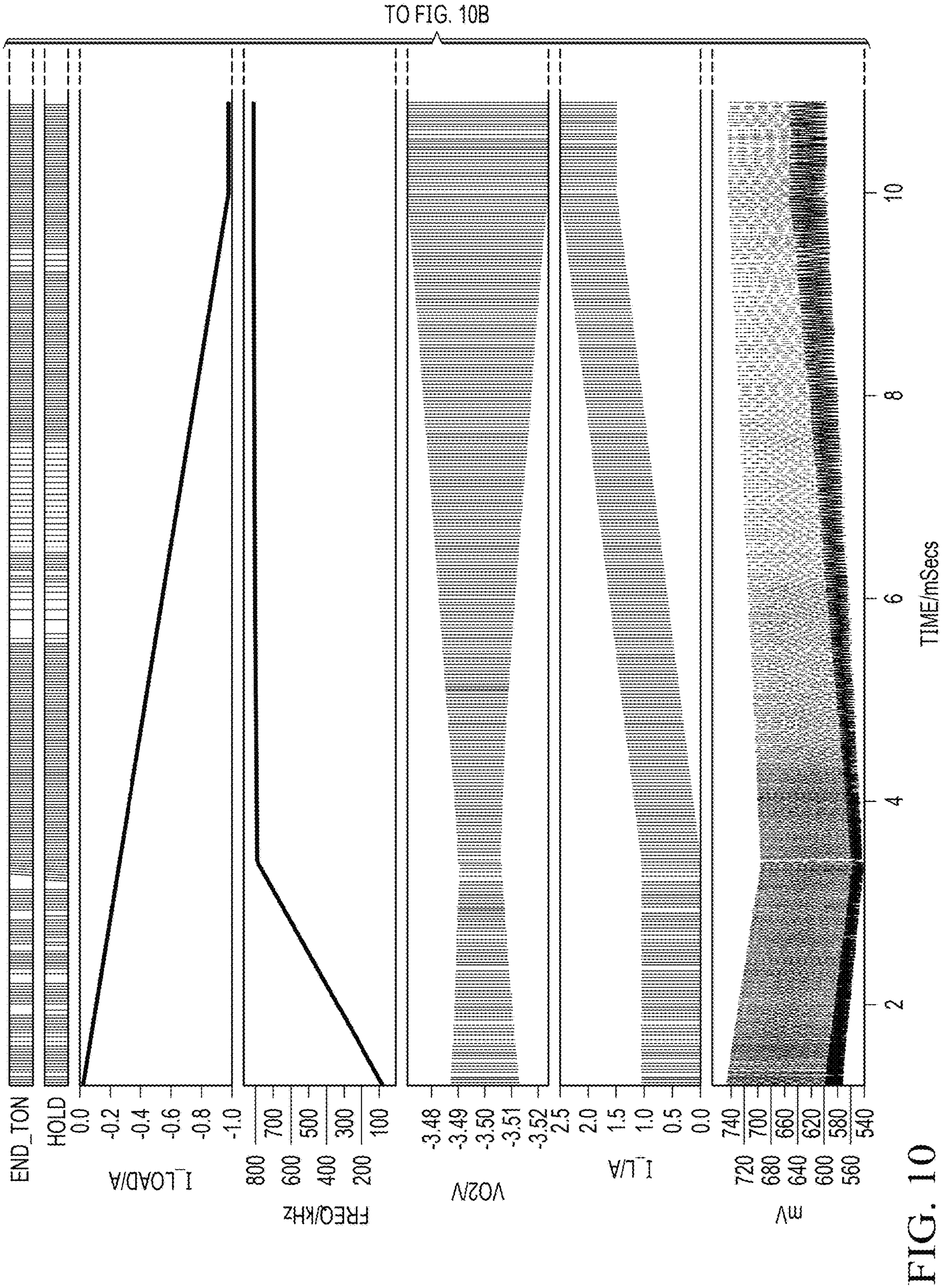
FIGS. 10 and 11 show a set of waveforms showing line transient response and pseudo-fixed frequency operation of the second voltage source circuit.
Figure 10:
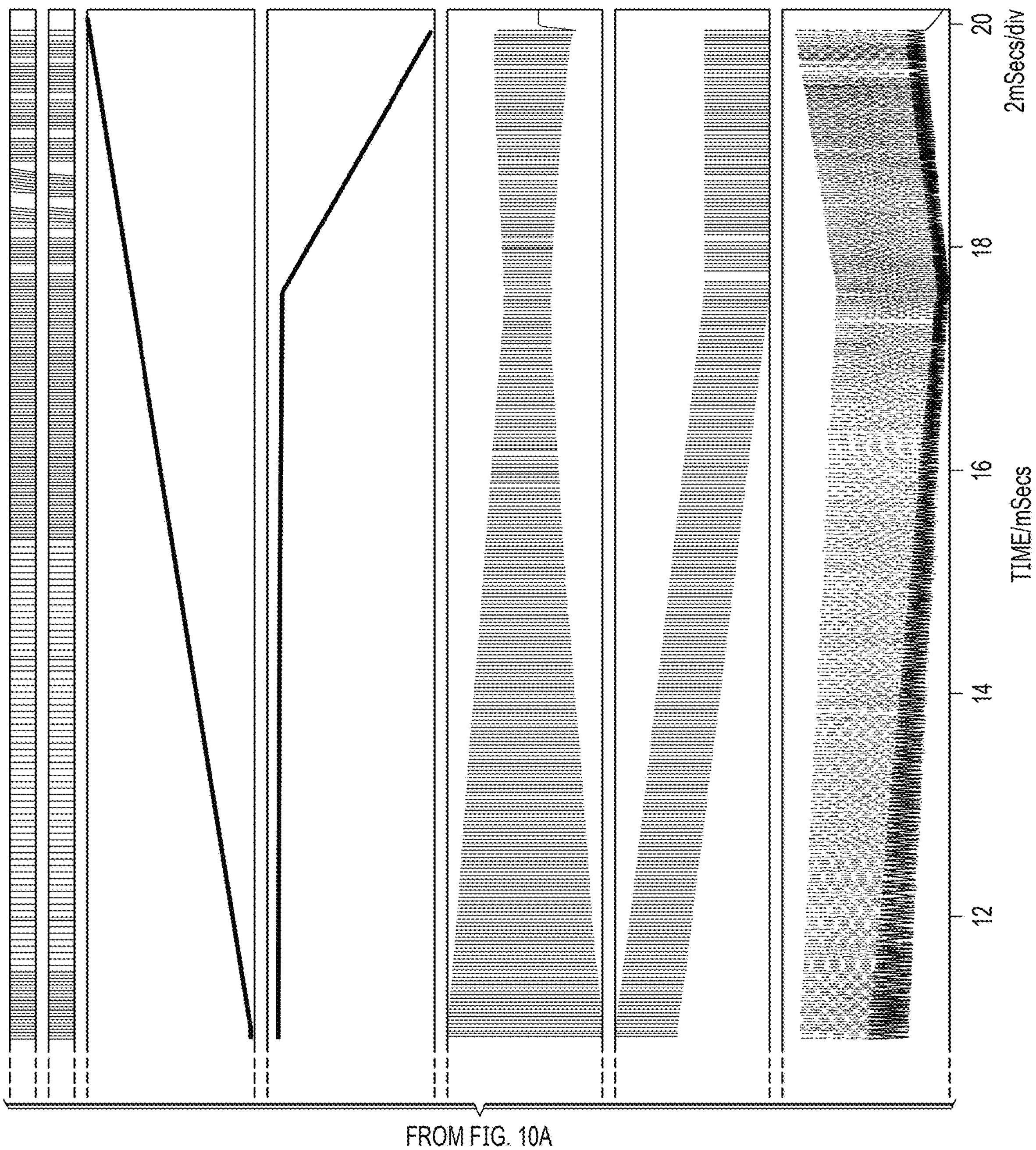
Figure 11:
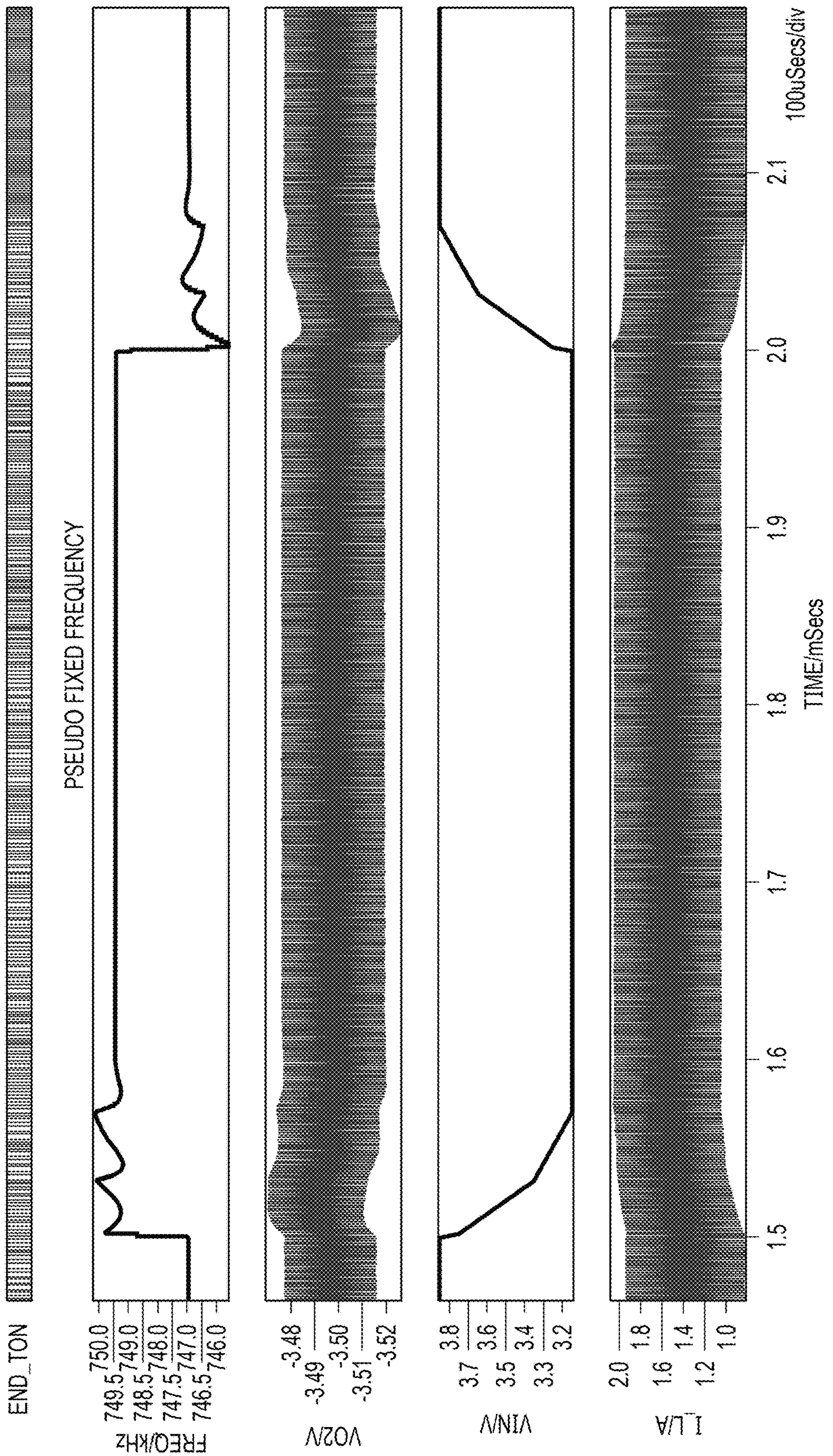

The adaptive TON control circuitry 220 maintains pseudo-fixed frequency operation regardless of input and output voltage variations. As shown in FIG. 9, the circuit responds to slow load transients by adjusting the on-time duration to maintain consistent switching behavior. FIG. 10 shows line transient response, where despite significant changes in input voltage, the switching frequency remains relatively constant, and FIG. 11 shows pseudo-fixed frequency operation.

The operation begins when the RESET_TON signal closes switch S1, discharging capacitor C. When switch S1 opens, amplifier 221 sources current proportional to the difference between VIN and VSSEL to charge capacitor C. The charging rate is adaptively controlled based on the input-output voltage differential. When the voltage at node N5 exceeds the voltage at node N6 (which is derived from VSSEL through amplifier 222), comparator 223 triggers the END_TON signal, terminating the high-side switch on-time.

This adaptive behavior ensures that the switching period remains nearly constant at TSW=RC, making it independent of both input voltage VIN and output voltage VSSEL variations—an improvement over traditional constant on-time controllers.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A voltage source circuit for generating a negative supply voltage, comprising:

a power stage configured to operate based upon gate drive signals, the power stage including a switching node;

an error amplifier configured to operate as an integrator at frequencies below a predetermined threshold and as an AC buffer at frequencies above the predetermined threshold, and configured to generate a control voltage based upon a feedback signal;

a ripple reconstructor circuit configured to reconstruct an attenuated ripple signal from the switching node;

a comparator having a non-inverting input coupled to receive the control voltage and an inverting input coupled to an output of the ripple reconstructor circuit, the comparator configured to generate a request signal;

an adaptive on-time control circuit configured to generate an end-of-on-time signal based on an input voltage and the negative supply voltage; and asynchronous logic configured to receive the request signal and the end-of-on-time signal and generate the gate drive signals based thereupon.

2. The voltage source circuit of claim 1, further comprising:

a digital-to-analog converter (DAC) configured to generate a reference voltage; and a voltage divider network coupled between an output of the voltage source circuit and the power stage, the voltage divider network configured to provide the feedback signal.

3. The voltage source circuit of claim 1, wherein the power stage comprises:

a first transistor having a drain coupled to the input voltage, a source coupled to the switching node, and a gate configured to receive a first gate drive signal, a second transistor having a drain coupled to the switching node, a source coupled to an output node, and a gate configured to receive a second gate drive signal, an inductor coupled between the switching node and ground, and an output capacitor coupled between the output node and ground;

wherein the voltage source circuit is configured as an inverting buck-boost converter that generates the negative supply voltage at the output node; and wherein the feedback signal is generated based upon the negative supply voltage.

4. The voltage source circuit of claim 3, wherein the power stage is configured to operate in continuous conduction mode when current through the inductor remains above zero throughout a switching cycle under heavy load conditions, and in discontinuous conduction mode when current through the inductor reaches zero during the switching cycle under light load conditions.

5. The voltage source circuit of claim 1, wherein the adaptive on-time control circuit comprises:

an operational transconductance amplifier (OTA) configured as a voltage controlled current generator that generates an output current proportional to a difference between the input voltage and the negative supply voltage;

a timing capacitor configured to be charged by the output current; and a further comparator configured to generate the end-of-on-time signal when a voltage across the timing capacitor exceeds a reference threshold.

6. The voltage source circuit of claim 5, wherein the adaptive on-time control circuit further comprises a switch configured to discharge the timing capacitor in response to a reset signal.

7. The voltage source circuit of claim 1, wherein the error amplifier comprises:

a resistor and capacitor network configured to provide the error amplifier operation as the integrator at frequencies below the predetermined threshold and the error amplifier operation as the AC buffer at frequencies above the predetermined threshold, wherein an impedance of the resistor and capacitor network determines a transition between the error amplifier operation as the integrator and the error amplifier operation as the AC buffer.

8. The voltage source circuit of claim 1, wherein the ripple reconstructor circuit comprises:

a resistor-capacitor network configured to couple to the switching node and filter it in low-pass manner; and circuitry configured to combine a switching node signal with a reference voltage to generate the attenuated ripple signal.

9. A method of generating a negative supply voltage, comprising:

generating a control voltage using an error amplifier that operates as an integrator at frequencies below a predetermined threshold and as an AC buffer at frequencies above the predetermined threshold based upon a feedback signal;

reconstructing an attenuated ripple signal from a switching node using a ripple reconstructor circuit;

comparing the control voltage with the reconstructed ripple signal to generate a request signal;

generating an end-of-on-time signal based on an input voltage and the negative supply voltage using an adaptive on-time control circuit;

generating gate drive signals based upon the request signal and the end-of-on-time signal using asynchronous logic; and operating a power stage based upon the gate drive signals to generate the negative supply voltage.

10. The method of claim 9, further comprising:

generating a reference voltage using a digital-to-analog converter (DAC); and providing the feedback signal using a voltage divider network coupled to an output of a voltage source circuit.

11. The method of claim 9, wherein operating the power stage comprises:

switching a first transistor and a second transistor at a switching frequency in an inverting buck-boost configuration;

transferring energy through an inductor coupled between the switching node and ground; and storing energy in an output capacitor to maintain the negative supply voltage.

12. The method of claim 11, further comprising operating the power stage in continuous conduction mode when current through the inductor remains above zero throughout a switching cycle under heavy load conditions, and in discontinuous conduction mode when current through the inductor reaches zero during the switching cycle under light load conditions.

13. The method of claim 9, wherein generating the end-of-on-time signal comprises:

generating an output current proportional to a difference between the input voltage and the negative supply voltage using an operational transconductance amplifier;

charging a timing capacitor with the output current; and comparing a voltage across the timing capacitor with a reference threshold to generate the end-of-on-time signal.

14. The method of claim 9, wherein the adaptive on-time control circuit maintains a substantially constant switching period that is independent of variations in the input voltage and the negative supply voltage.

15. An active matrix organic light emitting diode (AMOLED) display system, comprising:

an AMOLED display panel having pixels configured to emit light based on applied voltages;

a power management integrated circuit (PMIC) coupled to the AMOLED display panel, the PMIC comprising a voltage source circuit configured to generate a negative supply voltage, the voltage source circuit including:

a power stage configured to operate based upon gate drive signals, the power stage including a switching node;

an error amplifier configured to operate as an integrator at frequencies below a predetermined threshold and as an AC buffer at frequencies above the predetermined threshold, and configured to generate a control voltage based upon a feedback signal;

a ripple reconstructor circuit configured to reconstruct an attenuated ripple signal from the switching node;

a comparator having a non-inverting input coupled to receive the control voltage and an inverting input coupled to an output of the ripple reconstructor circuit, the comparator configured to generate a request signal;

an adaptive on-time control circuit configured to generate an end-of-on-time signal based on an input voltage and the negative supply voltage; and asynchronous logic configured to receive the request signal and the end-of-on-time signal and generate the gate drive signals based thereupon; and a first voltage source circuit configured to generate a positive supply voltage for the pixels of the AMOLED display panel;

wherein the AMOLED display panel receives the negative supply voltage and the positive supply voltage to provide a voltage differential for driving the pixels.

16. The AMOLED display system of claim 15, wherein the PMIC further comprises:

a first low drop-out amplifier configured to regulate the positive supply voltage; and a second low drop-out amplifier configured to regulate the negative supply voltage.

17. The AMOLED display system of claim 15, further comprising:

a digital-to-analog converter (DAC) configured to generate a reference voltage; and a voltage divider network coupled between an output of the voltage source circuit and the power stage, the voltage divider network configured to provide the feedback signal.

18. The AMOLED display system of claim 15, wherein the power stage comprises:

a first transistor having a drain coupled to the input voltage, a source coupled to the switching node, and a gate configured to receive a first gate drive signal, a second transistor having a drain coupled to the switching node, a source coupled to an output node, and a gate configured to receive a second gate drive signal, an inductor coupled between the switching node and ground, and an output capacitor coupled between the output node and ground;

wherein the voltage source circuit is configured as an inverting buck-boost converter that generates the negative supply voltage at the output node; and wherein the feedback signal is generated based upon the negative supply voltage.

19. The AMOLED display system of claim 18, wherein the power stage is configured to operate in continuous conduction mode when current through the inductor remains above zero throughout the switching cycle under heavy load conditions, and in discontinuous conduction mode when current through the inductor reaches zero during a switching cycle under light load conditions.

20. The AMOLED display system of claim 15, wherein the adaptive on-time control circuit comprises:

an operational transconductance amplifier (OTA) configured as a voltage controlled current generator that generates an output current proportional to a difference between the input voltage and the negative supply voltage;

a timing capacitor configured to be charged by the output current; and a further comparator configured to generate the end-of-on-time signal when a voltage across the timing capacitor exceeds a reference threshold.

21. The AMOLED display system of claim 20, wherein the adaptive on-time control circuit further comprises a switch configured to discharge the timing capacitor in response to a reset signal.

22. The AMOLED display system of claim 15, wherein the error amplifier comprises:

a resistor and capacitor network configured to provide the error amplifier operation as the integrator at frequencies below the predetermined threshold and the error amplifier operation as the AC buffer at frequencies above the predetermined threshold, wherein an impedance of the resistor and capacitor network determines a transition between the error amplifier operation as the integrator and the error amplifier operation as the AC buffer.

23. The AMOLED display system of claim 15, wherein the ripple reconstructor circuit comprises:

a resistor-capacitor network configured to couple to the switching node and filter switching artifacts; and circuitry configured to combine a switching node signal with a reference voltage to generate the attenuated ripple signal.

* * * * *